US008012030B2

(12) United States Patent
Cermak et al.

(10) Patent No.: US 8,012,030 B2
(45) Date of Patent: Sep. 6, 2011

(54) CONNECTING ASSEMBLY BETWEEN A SHAFT JOURNAL AND A CONSTANT VELOCITY UNIVERSAL JOINT

(75) Inventors: Herbert Cermak, Bessenbach (DE);
Michael Zierz, Freiensteinau (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 318 days.

(21) Appl. No.: 12/371,074

(22) Filed: Feb. 13, 2009

(65) Prior Publication Data
US 2009/0209354 A1 Aug. 20, 2009

(30) Foreign Application Priority Data

Feb. 14, 2008 (DE) .......................... 10 2008 009 363

(51) Int. Cl.
*F16C 3/00* (2006.01)
(52) U.S. Cl. ........................................ 464/182; 464/906
(58) Field of Classification Search .................. 464/182, 464/906; 411/353, 517, 530
See application file for complete search history.

(56) References Cited

U.S. PATENT DOCUMENTS

| | | | | |
|---|---|---|---|---|
| 1,758,515 | A | * | 5/1930 | Heiermann .................... 411/517 |
| 2,456,355 | A | * | 12/1948 | Aber .............................. 411/353 |
| 3,110,524 | A | * | 11/1963 | Zeller et al. .................... 411/353 |
| 3,633,382 | A | * | 1/1972 | Westercamp ................. 464/906 |
| 3,822,570 | A | * | 7/1974 | Fisher ............................ 464/906 |
| 3,858,412 | A | * | 1/1975 | Fisher et al. ................... 464/906 |
| 4,111,464 | A | * | 9/1978 | Asano et al. |
| 4,229,952 | A | * | 10/1980 | Aucktor et al. ................ 464/906 |
| 4,460,058 | A | | 7/1984 | Welschof et al. |
| 4,756,640 | A | | 7/1988 | Gehrke |
| 4,995,850 | A | * | 2/1991 | van der Drift et al. ........ 464/906 |
| 5,749,606 | A | * | 5/1998 | Lu et al. |
| 2001/0016520 | A1 | * | 8/2001 | Sahashi et al. ................ 464/182 |
| 2005/0192106 | A1 | | 9/2005 | Cermak |
| 2006/0217208 | A1 | * | 9/2006 | Worman et al. |
| 2008/0051204 | A1 | * | 2/2008 | Hahn et al. .................... 464/182 |

(Continued)

FOREIGN PATENT DOCUMENTS

DE 3116720 10/1982

(Continued)

OTHER PUBLICATIONS

Machine Translation of DE 102 15 657.*

(Continued)

*Primary Examiner* — Gregory Binda
*Assistant Examiner* — Josh Skroupa
(74) *Attorney, Agent, or Firm* — Rader, Fishman & Grauer PLLC

(57) ABSTRACT

The invention relates to a connecting assembly which is used, more particularly for use in the driveline of a motor vehicle. The connecting assembly comprises a shaft journal 3 with an outer journal groove 34; a constant velocity universal joint 4 with an inner joint part 6 which, for the purpose of transmitting torque, is connected to the shaft journal 3 in a rotationally fixed way, wherein the inner joint part 6 comprises a sleeve-like portion 20 with an inner annular groove 35; a radially elastically widenable axial securing ring 30 which is provided for axially fixing the inner joint part 6 and which is positioned in the journal groove 34 of the shaft journal 3; and securing means 41 which are fixed to the sleeve-like portion 20 and prevent the axial securing ring 30 from being radially widened.

19 Claims, 4 Drawing Sheets

U.S. PATENT DOCUMENTS

2010/0239364 A1    9/2010    Cermak

FOREIGN PATENT DOCUMENTS

| DE | 3642438 | 7/1987 |
| DE | 10215657 | 10/2003 |
| DE | 102004009477 | 9/2005 |
| DE | 102004048079 | 4/2006 |
| DE | 102004048079 A1 | 4/2006 |
| DE | 102006034035 | 1/2008 |
| DE | 102006034985 | 1/2008 |
| DE | 102007026040 | 12/2008 |

OTHER PUBLICATIONS

Machine Translation of DE 10 2004 048 079 (5 pages).

* cited by examiner

CONNECTING ASSEMBLY BETWEEN A SHAFT JOURNAL AND A CONSTANT VELOCITY UNIVERSAL JOINT

CROSS-REFERENCES TO RELATED APPLICATION

This application claims priority to German patent application DE 10 2008 009 363.7 filed Feb. 14, 2008, which is hereby incorporated by reference in its entirety.

BACKGROUND AND SUMMARY

The invention relates to a connecting assembly between a shaft journal and a constant velocity universal joint, more particularly in the driveline of a motor vehicle. The constant velocity universal joint comprises an outer joint part which can be connected to a driveshaft for example; an inner joint part which is engaged in a rotationally fixed way by the shaft journal for transmitting torque; as well as torque transmitting elements which are effective between the outer joint part and the inner joint part. The shaft journal can be the input part or output part of a gearbox, more particularly of an axle differential or of a manual gearbox, so that the shaft journal is axially and radially fixed. Accordingly, the constant velocity universal joint can be positioned at one end of a propeller shaft. The shaft journal can also be supported in an elastic intermediate bearing, with the constant velocity universal joint then being used as the central joint of a two-part propeller shaft.

From DE 10 2004 048 079 A1, there is known a connecting assembly between a constant velocity universal joint which is arranged at the end of the propeller shaft and an axially fixed shaft journal of a gearbox. By means of longitudinal splines, the shaft journal engages an inner joint part of a constant velocity joint in a rotationally fixed way. The propeller shaft comprises a threaded portion on to which there is threaded a threaded sleeve. The threaded sleeve engages a threaded recess of the inner joint part, with a securing ring arranged in the threaded recess axially fixing the inner joint part relative to the threaded sleeve.

From DE 10 2004 009 477 B4, there is known a further connecting assembly between a constant velocity universal joint and a shaft journal. There is provided a sleeve which is firmly connected to the inner joint part and engages an annular groove of the shaft journal, so that there is achieved an axially effective engaging connection. The sleeve is radially secured by a tensioning band in the region of the engaging connection.

Overall, connecting a constant velocity universal joint to a shaft journal is complicated because there is available only a limited amount of space and the final assembly stage is also complicated. At the same time, the connecting assembly between the constant velocity universal joint and the shaft journal is subject to optimum safety regulations to prevent disconnection and to ensure minimum adverse effects on the strength of the components.

The present invention provides a connecting assembly between a constant velocity universal joint and a shaft journal, wherein the connecting assembly has a compact design, permits secure axial fixing conditions and ensures a minimum effect on the shaft strength, with easy assembly and dismantling procedures being ensured as well.

The connecting assembly, more particularly for use in the driveline of a motor vehicle, comprises a shaft journal with an outer journal groove; a constant velocity universal joint with an inner joint part which is connected to the shaft journal in a rotationally fixed way for transmitting torque, wherein the inner joint part comprises a sleeve-like portion with an inner annular groove; a radially elastically widenable axial securing ring which is provided for axially fixing the inner joint part and which is positioned in the journal groove of the shaft journal; and securing means which are arranged on the sleeve-like portion and prevent the axial securing ring from being radially widened.

The advantage of the inventive connecting assembly is that there are achieved secure axial fixing conditions between the inner joint part and the shaft journal. More particularly, if there occur centrifugal forces or if axial forces are introduced into the connecting assembly, the securing means offer an effective protection against radial widening of the axial securing ring and thus a reliable connection. Furthermore, the inventive assembly only has a minimum effect on the strength of the shaft journal, because it is possible to use axial securing rings whose shape requires only a slight reduction in the cross-section of the shaft journal. The depth of the journal groove into which the axial securing ring snaps is preferably smaller than the depth of the inner annular groove of the sleeve-like portion. A further advantage refers to the simple design of the connecting assembly which comprises only few parts, which has an advantageous effect on production costs. The assembly requires a small installation space only and the components are easy to mount. More particularly, the constant velocity universal joint can be completely pre-assembled, so that, during the final assembly stage, only the connection between said joint and the shaft journal has to be effected.

For assembly purposes, the axial securing ring is inserted into the annular groove of the sleeve-like portion, and the inner joint part and thus the entire constant velocity universal joint is slid onto the shaft journal. The axial securing ring is preferably radially widened by an end cone of the shaft journal and snaps inwardly when it reaches the journal groove. In this way, the axial securing ring is radially inwardly pretensioned, i.e. it is positioned with pretension in the journal groove. If required, the connecting assembly can be easily released by elastically widening the axial securing ring, with the functioning ability of the individual components being fully retained.

The shaft journal can preferably be the input part or output part of a gearbox. If the shaft journal constitutes the input part, it can be used in an axle differential, for example, which serves to distribute the introduced torque from the propeller shaft to two sideshafts. In the form of an output part, the shaft journal can be used in a manual gearbox, for example, from where the torque is introduced into the propeller shaft. The gearbox is incorporated before the driveshaft is mounted, so that the shaft journal is axially and radially fixed in the gearbox housing.

According to a first embodiment, the axial securing ring is provided in the form of a snap ring, i.e. an open ring. According to a second embodiment, the axial securing ring is provided in the form of a continuously closed ring.

If a snap ring is used, it is particularly advantageous if said snap ring, and optionally also the journal groove, comprise a rectangular profile. The rectangular profile ensures that, if axial forces occur between the inner joint part and the shaft journal, there will not occur a sliding movement at the contact faces and thus no radial widening of the snap ring. However, any other cross-sectional shapes are conceivable, for example round, oval or trapezoidal cross-sections. For handling purposes, it is particularly advantageous if the at least two outwardly projecting portions form the ends of the open snap ring. The sleeve-like portion of the inner joint part, in a partial circumferential region of the inner annular groove, comprises a recess towards the outer circumferential face in which the ends of the snap ring are received. Said recess extends in the axial direction, preferably as far as the end face of the sleeve-like portion, so that there is formed a free space for mounting and dismantling purposes. For securing the connecting assembly, it is particularly advantageous if the ends of the snap ring project radially at least as far as the outer circumferential face, when the snap ring engages the journal groove.

If a closed ring is used, the cross-section of the same is preferably shaped in such a way that an axial relative movement of the ring relative to the shaft journal causes a radial-elastic widening of the ring. This can be achieved, for example, by a round, an oval or a trapezoidal cross-section of the securing ring. The advantage of said embodiment is that, by applying an axial force, the assembly can be easily dismantled provided the securing means for preventing the securing ring from widening have been removed.

According to an advantageous further design, which applies to the first and the second embodiment, the outwardly projecting portions are provided in the form of circumferentially distributed bulging portions of the axial securing ring. In principle, the number of bulging portions which are preferably uniformly distributed around the circumference, can be freely selected, with a number of at least three, preferably four, radial bulging portions being advantageous for the purpose of centring the axial securing ring relative to the inner joint part. In partial circumferential regions of the inner annular groove, the sleeve-like portion of the inner joint part preferably comprises a plurality of recesses towards the outer circumferential face and end face of the sleeve-like portion, into which the bulging portions of the axial securing ring are able to extend. In a cross-sectional view, the recesses are just large enough to accommodate the bulging portions extending into same without having any space to allow elastic deformation. To achieve simple securing conditions it is advantageous if the bulging portions are designed in such a way that their outer end faces at least radially extend as far as the outer circumferential face of the sleeve-like portion, when the axial securing ring is in an engaging condition in the journal groove. If an open ring with bulging portions is used, the opening slot is preferably located in the circumferential direction between two adjoining bulging portions.

According to a preferred design which also applies to both the above-mentioned embodiments, the securing means are provided in the form of a sleeve element to prevent the axial securing ring from widening in the radial direction. Said sleeve element is positioned on the sleeve-like portion of the inner joint part and covers the at least one recess. In the slid-on condition of the sleeve element, the outwardly projecting end portions of the open ring, respectively the bulging portions of the closed ring rest against the inner face of the sleeve element, thus preventing the axial securing ring from widening. Particularly good securing conditions are achieved if the sleeve element is reinforced in the region of overlap with the ends of the open securing ring and, respectively, with the bulging portions of the closed securing ring, for example by an inner reinforcing ring. The slid-on sleeve element, which can also be denoted securing sleeve or collar, ensures in an advantageous way that radial widening of the axial securing ring is prevented at least to the extent that it can no longer be pressed out of the journal groove. The sleeve element preferably comprises an inner annular bead which, for axial securing purposes, engages an outer annular groove of the sleeve-like portion. The sleeve element is fixed by a binding element which, more particularly, is designed in such a way that it can only be closed if the sleeve element is accurately positioned on the sleeve-like portion. This measure prevents unintentional incorrect mounting.

According to a preferred design which applies to all the above-mentioned embodiments there are provided shaft splines in order to achieve a rotationally fixed connection between the inner joint part and the shaft journal, with the annular groove, into which the axial securing ring is inserted, being arranged so as to axially adjoin the shaft teeth. The annular groove is easier to produce because it is not positioned inside the shaft teeth. In a preferred embodiment, the inner joint part comprises a ball track portion in which there are formed inner ball tracks, with the shaft splines axially extending beyond the ball track portion as far as the inside of the sleeve-like portion of the inner joint part. This measure of providing extended shaft splines allows the transmission of particularly high torque values. Furthermore, it is proposed that, in the region of the sleeve-like portion, the inner joint part comprises an outer annular groove in which there is fixed an inner shoulder of a sealing collar by means of a clamping ring. The joint designed in this way can be completely pre-assembled prior to being connected to the shaft journal. By providing the sealing collar in the form of a diaphragm boot, it is possible to achieve a particularly compact design.

BRIEF DESCRIPTION OF THE DRAWINGS

Preferred embodiments will be described below with reference to the Figures wherein.

DETAILED DESCRIPTION

Figure 1A:
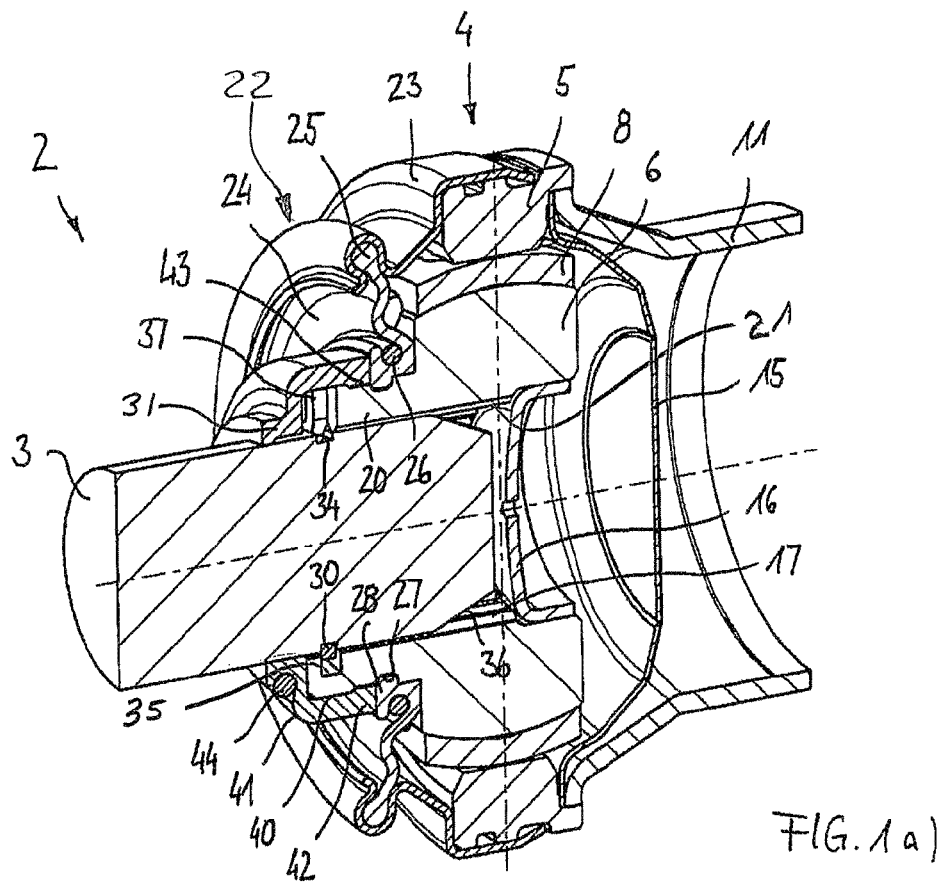
FIG. 1 shows an inventive connecting assembly between a shaft journal and a constant velocity universal joint in a first embodiment with an open axial securing ring
  a) in half a longitudinal section in a perspective view,
  b) in a cross-section through a plane which contains the axial securing ring.

Below, the Figures will initially be described jointly to the extent that they can be seen to comprise corresponding details. A shaft journal 3 is connected to a constant velocity universal joint 4 in a way which has yet to be explained in greater detail. The constant velocity joint is designed in the form of a counter track fixed joint. The shaft journal 3 is axially and radially supported by means of a rolling contact bearing in a drive housing (not shown). The drive can be an axle differential or the transmission of a motor vehicle for example, with the constant velocity universal joint 4 then being arranged at one end of the propeller shaft. To that extent, the shaft journal 3 is axially fixed in the drive housing and cannot be displaced during the final assembly stage of the constant velocity universal joint 4 and the driveshaft connected thereto.

The constant velocity universal joint 4 comprises an outer joint part 5, an inner joint part 6, torque transmitting balls 7 and a ball cage 8. In the illustrations according to FIGS. 1 and 2, the balls are arranged in a different sectional plane and therefore cannot be seen. As can be seen in FIG. 3, the balls 7 are held in first outer ball tracks 9 and first inner ball tracks 10 which open towards the driveshaft, as well as in second outer ball tracks 12 and second inner ball tracks 13 which open towards the shaft journal. A hollow shaft 11 is welded to the outer joint part 5. The hollow shaft 11 comprises a shaft tube with a flange part 14 at its end. Between the flange part 14 and the outer joint part 5, there is inserted a cover 15 which seals the joint chamber towards the shaft tube. Needless to say, the constant velocity universal joint 4 can be any type of joint other than a counter track joint.

On its side opposite to the hollow shaft 11, the constant velocity universal joint 4 is sealed by a sealing assembly 22. The sealing assembly 22 comprises a holding element 23 which is fixed to the outer joint part 5, more particularly clipped on, as well as a sealing member 24 which, by means of a continuous outer bead 25, sealingly engages a beaded end of the holding ring 23. Radially inside, the sealing member 24, which is provided in the form of a diaphragm boot, comprises an inner bead 28 which engages a corresponding annular groove 27 of the inner joint part 6. For fixing the inner bead 28 on the inner joint part 6, there is provided a securing ring 26 which engages a corresponding annular recess on the outside of the bead 28. The inner joint part 6 comprises a ball track portion 19 which extends along the length of the inner ball tracks 10, 13, as well as an axially adjoining sleeve-like portion 20. The sleeve-like portion 20 is integrally formed onto the inner joint part 6 and can therefore also be referred to as a sleeve projection. It goes without saying that the sleeve-like portion 20 can also be initially produced as a separate component and subsequently firmly connected to the inner joint part, for example by welding. The continuous annular groove 27 for fixing the diaphragm boot 24 is arranged in the sleeve-like portion 20 so as to axially adjoin the ball track portion 19.

The inner joint part 6 comprises a central through-aperture 21 with inner shaft splines 17 into which there is inserted the shaft journal 3 with corresponding outer shaft splines for transmitting torque. In an end portion facing the hollow shaft 11, the central through-bore 21 comprises a radially widened bore portion into which there is inserted a further cover 16 for sealing the joint chamber. In this way, the joint chamber is sealed by the sealing assembly 22 and by the two covers 15, 16, so that the escape of lubricant and the penetration of dirt are avoided.

At its end facing the joint 4, the shaft journal 3 comprises an outer conical face 36 for being inserted into the bore 21 of the inner joint part 6. For axially securing the shaft journal 3 relative to the inner joint part 6, there is provided an axial securing ring 30 which, on its inside, is positioned in a continuous outer journal groove 34 of the shaft journal 3 and, on its outside, in an inner annular groove 35 of the inner joint part 6. The axial securing ring 30 is pretensioned radially inwardly. For mounting purposes, the axial securing ring 30 is inserted into the annular groove 35 of the sleeve-like portion 20 of the inner joint part 6, and the inner joint part 6, and thus the entire constant velocity universal joint, is slid onto the shaft journal 3. The axial securing ring 30 is radially widened by the conical face 36 of the shaft journal 3 and snaps radially inwardly when reaching the journal groove 34.

Below, there will follow a description of the special features of the different embodiments as regards the connection between the shaft journal 3 and the inner joint part 6.

Figure 1B:
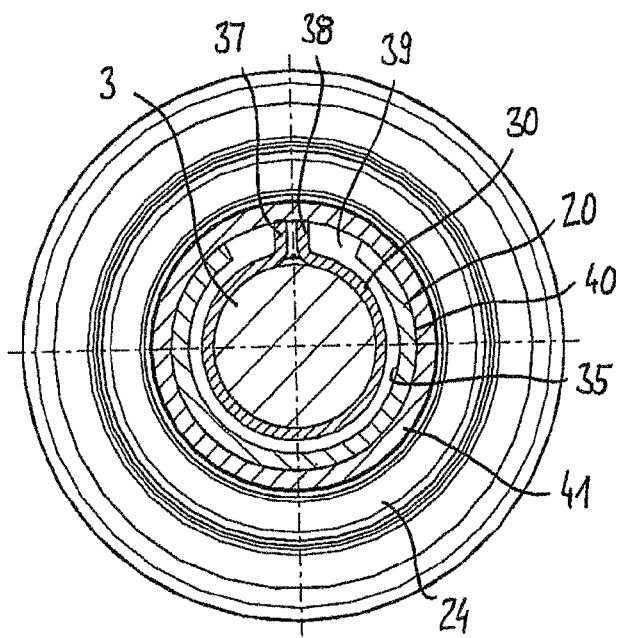

In the embodiment shown in FIG. 1, the axial securing ring 30 is provided in the form of a snap ring. The snap ring is open and comprises two outwardly projecting portions 37, 38 which form the ends of the open snap ring. The radially outwardly directed ends 37, 38 are arranged so as to adjoin one another in the circumferential direction, so that they can be handled easily by a tool. The ends 37, 38 of the snap ring 30 are received in a radial recess 39 of the inner joint part 6, which recess 39 provides access and permits dismantling. The recess 39 is located in a partial circumferential region of the annular groove 35 and is open towards an outer circumferential face 40 of the sleeve-like portion 20. The snap ring 30 can be pre-fitted into the annular groove 35 of the inner joint part 6, with the radial ends 37, 38 having sufficient space in the circumferential direction in the recess 39 to be able to be widened while being slid on to the shaft journal 3. In the widened condition of the snap ring 30, when the inner joint part 6 with the inserted snap ring 30 is in a position between the conical face 36 and the journal groove 34, the radial ends 37, 38 clearly radially project beyond the circumferential face 40. After the snap ring 30 has engaged the journal groove 34, the ends 37, 38 snap radially inwardly and are then positioned approximately in the region of the outer circumferential face 40 of the sleeve-like portion 20.

There are provided securing means 41 to protect the snap ring 30 from widening unintentionally, which could result in the joint 4 being disconnected from the shaft journal 3. Said securing means 41 are preferably provided in the form of a sleeve element which is slid onto the sleeve-like portion 20 after the snap ring 30 has been inserted, wherein the sleeve element covers the recess 39 and the ends 37, 38 arranged therein. In this way, the snap ring 30 is prevented from being radially widened, for example as a result of centrifugal forces, so that it is securely held in the journal groove 34. The sleeve element 41 comprises a cylindrical portion with an inner annular bead 42 which engages an outer annular groove 43 of the sleeve-like portion 20 for axial securing purposes. At the gearbox end, the sleeve element 41 comprises a radial portion which covers the end face of the sleeve-like portion 20, as well as an inner cylindrical collar 31 by means of which the sleeve element 41 is positioned on the shaft journal. The sleeve element 41 is fixed to the shaft journal 3 by means of a fixing ring 44 which is arranged on the collar 31. The sleeve element 41 can be slid on to the sleeve-like portion 20 of the inner joint part prior to the driveshaft being mounted. In principle, it is also conceivable for the securing sleeve 41 to be produced so as to be integral with the sealing sleeve 24, which would reduce the number of parts even further.

It can be seen that the snap ring 30 and the journal groove 34 comprise a rectangular profile. In the case of axial forces, the side face of the snap ring 30 comes into contact with the radial side wall of the journal groove 34, with no radial forces being generated. To that extent, the effect of axial forces on the connecting assembly cannot lead to a widening of the snap ring 30, so that the latter is securely held in the journal groove 34. However, for certain applications it is also conceivable for the snap ring to comprise a profile other than a rectangular one. A snap ring with a round or oval profile —assuming the collar has been removed—would permit an easy dismantling procedure by simply pulling the inner joint part off the shaft journal.

Figure 2:
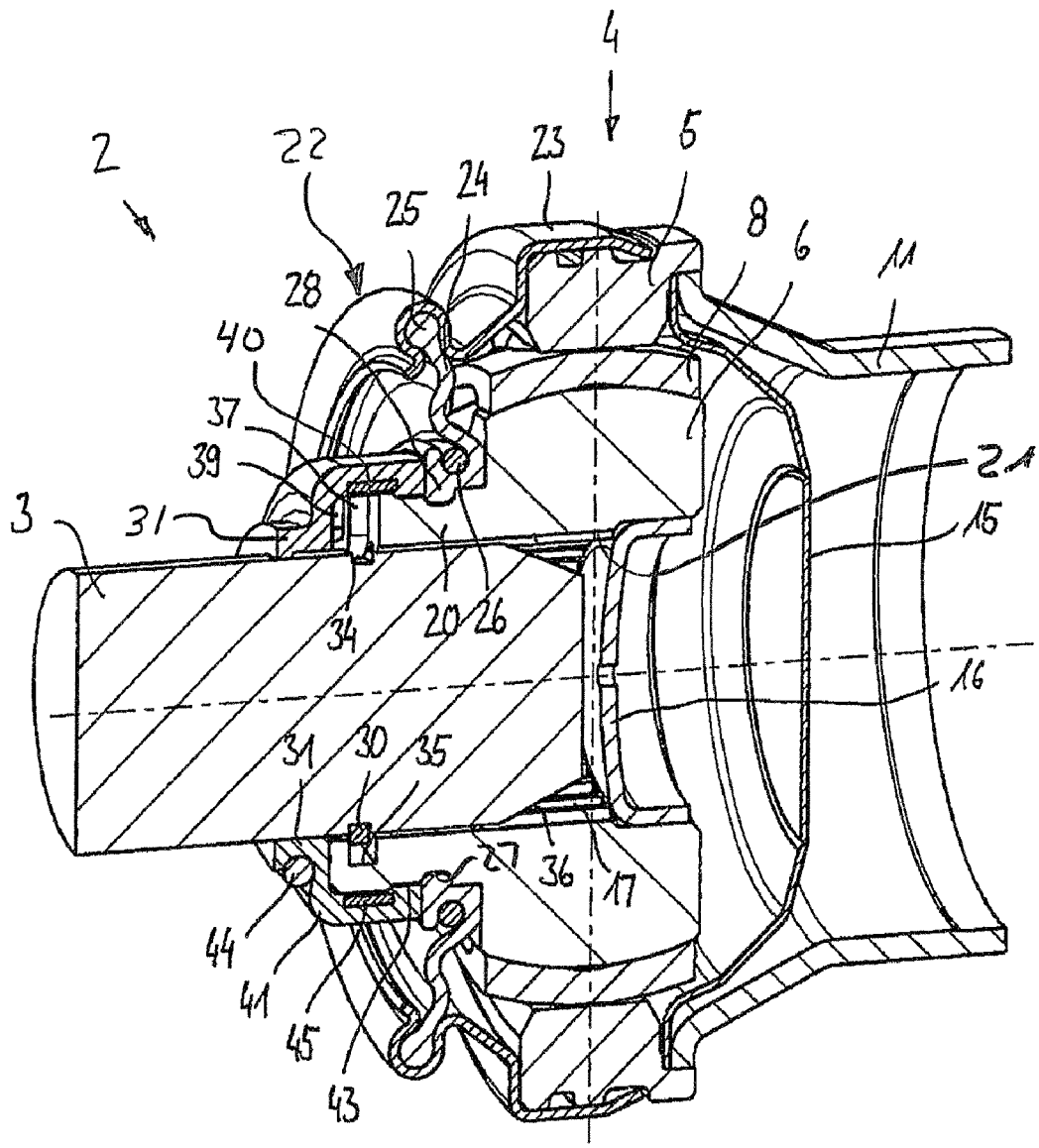
FIG. 2 shows an inventive connecting assembly between a shaft journal and a constant velocity universal joint in a second embodiment with an open axial securing ring in a perspective view, in a longitudinal section.
Figure 3A:
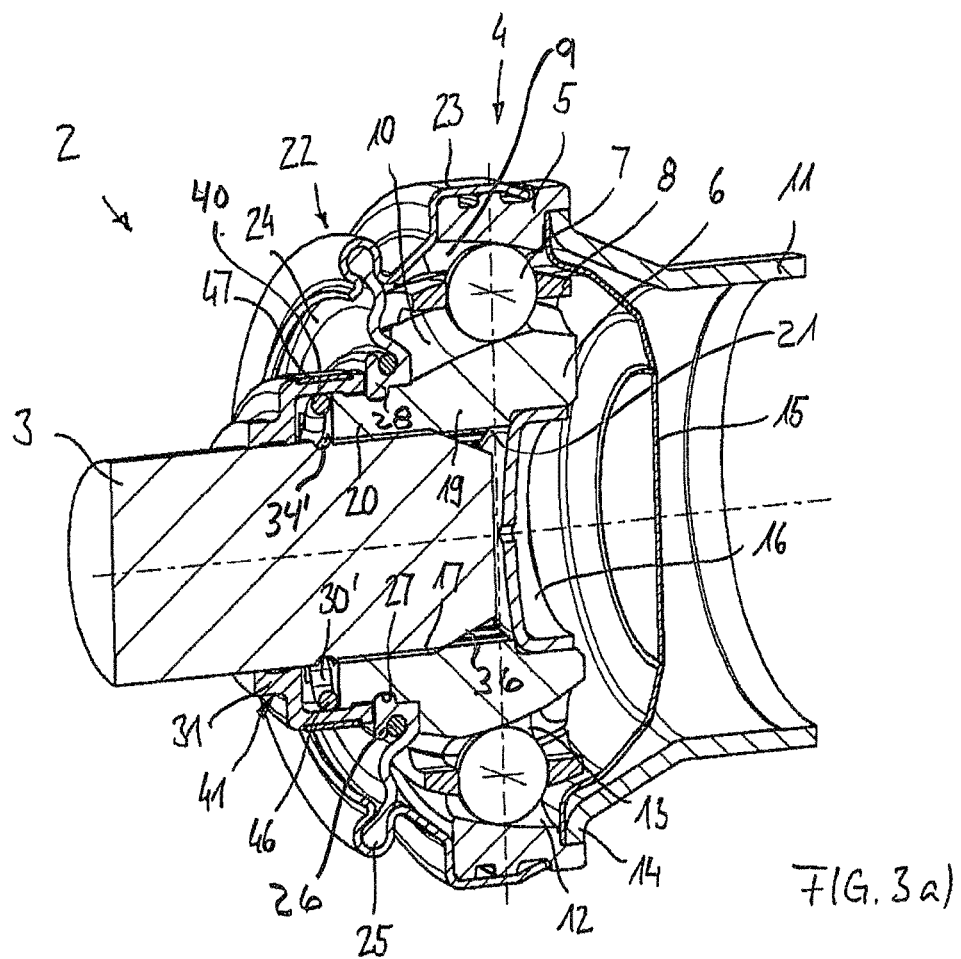
FIG. 3 shows an inventive connecting assembly between a shaft journal and a constant velocity universal joint in a third embodiment with a closed axial securing ring
  a) in a longitudinal section in a perspective view,
  b) in an axial view in a cross-sectional plane which contains the axial securing ring and
  c) the axial securing ring in the form of a detail.
Figure 3B:
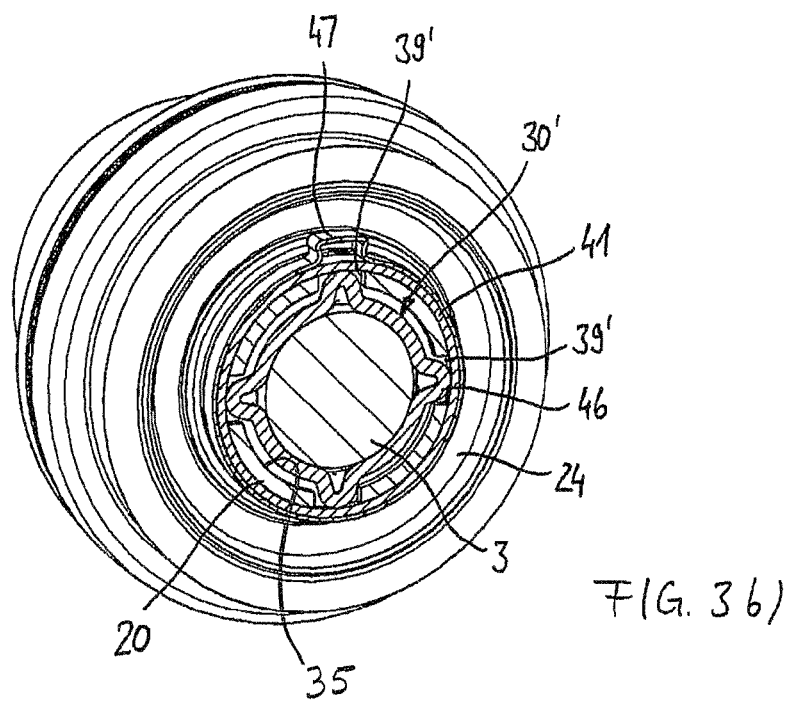
Figure 3C:
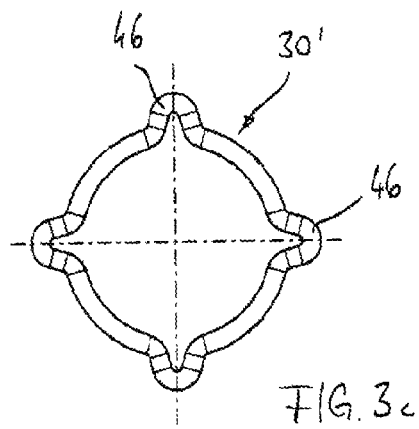

The embodiment according to FIG. 2, in respect of design and mode of functioning, widely corresponds to that shown in FIG. 1. To that extent, reference is made to the above description, with identical components having been given the same reference numbers. The only difference consists in that the securing sleeve 41 in the present embodiment, in the region of the recess 39 and, respectively of the securing ring 30, comprises an inner reinforcing ring 45. The reinforcing ring 45 consists of a material whose strength is higher than that of the securing sleeve 41, so that the snap ring 30 is prevented even more reliably from widening, which could be caused by an undesirable penetration of the ends 37, 38 into the sleeve element 41.

The connecting assembly shown in FIG. 3 is similarly designed to that according to FIGS. 1 and 2, so that, as far as common features are concerned, reference is made to the above description, with corresponding components having been given the same reference numbers and modified components having been provided with reference numbers with an apostrophe.

In the present embodiment, the axial securing ring 30' is provided in the form of a continuously closed ring 30'. The ring 30' is designed in such a way that it elastically widens when being slid on to the conical face 36. For this purpose, the closed ring 30' comprises a plurality of circumferentially distributed bulging portions 46 which outwardly project beyond the annular portions formed between the bulging portions 46 in the circumferential direction. It is particularly obvious from FIGS. 3b) and 3c) that there are provided four radial bulging portions which are uniformly distributed around the circumference. Accordingly, the sleeve-like portion 20 of the inner joint part 6, in partial circumferential regions of the journal groove 34', comprises a plurality of recesses 39' which extend radially as far as the outer circumferential face 40 and axially as far as the end face of the sleeve-like portion 20 and in which there are received the radial bulging portions 46 of the securing ring 30'.

The present embodiment, too, allows the securing ring 30' to be pre-mounted into the annular groove 35 of the inner joint part 6, with the radial bulging portions 46, when being slid on to the shaft journal 3, being pressed radially outwardly. In the widened condition of the securing ring 30', i.e. when the inner joint part 6 with the inserted securing ring 30' is in a position between the conical face 36 and the journal groove 34', the bulging portions 46 clearly project radially outwardly beyond the circumferential face 40. When the securing ring 30' engages the journal groove 34', the radial bulging portions 46 move radially inwardly and are then positioned approximately in the region of the outer circumferential face 40 of the sleeve-like portion 20.

The profile of the securing ring 30' is such that an application of an axial force causes elastic widening of the securing ring 30'. In this way, the connecting assembly can be easily dismantled by pulling the joint 4 off the shaft journal 3. For this purpose, the securing ring 30' in the present embodiment comprises a round profile, but other cross-sectional shapes such as an oval or trapezoidal cross-section are also conceivable. This also applies to the above-mentioned embodiments according to FIG. 1 or 2.

To prevent unintentional disconnection of the axial securing ring 30', the present embodiment according to FIG. 3 is also provided with securing means in the form of the sleeve element 41 which is arranged on the sleeve-like portion 20 of the inner joint part 6 and covers the radial recesses 39'. The bulging portions 46 have radial outer ends which, in the slid-on condition of the sleeve element 41, rest against the inner face of the sleeve element 41, so that the securing ring 30' is prevented from being widened. In this way, it is ensured that a radial elastic widening of the securing ring 30' is prevented at least to that extent that it can no longer be pressed out of the journal groove 34. In the present embodiment, the sleeve element 41 is fixed by a binding element 47. The binding element 47 is designed in such a way that it cannot be fixed on the collar 41 and closed unless the collar 41 is accurately positioned on the sleeve-like portion 20. This design ensures that the assembly is mounted securely.

Figure 4A:
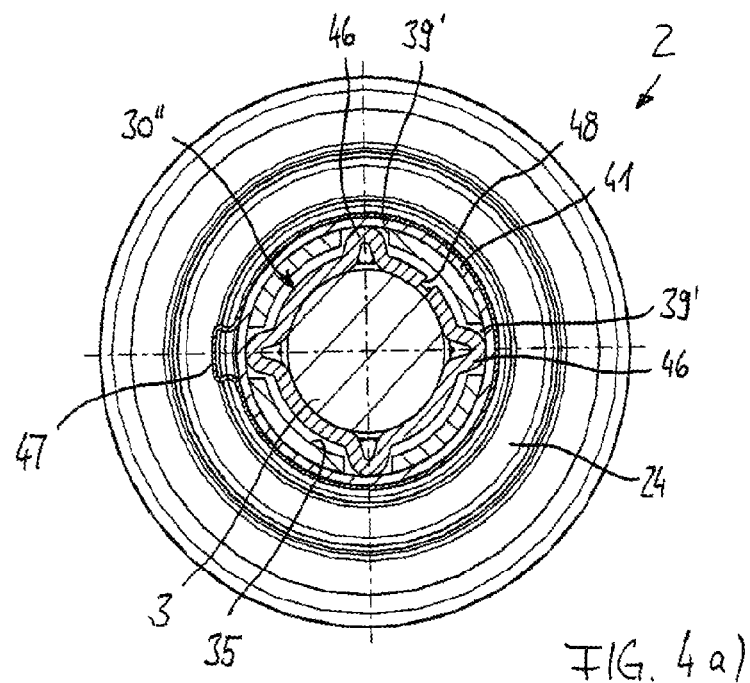
FIG. 4 shows an inventive connecting assembly between a shaft journal and a constant velocity universal joint in a fourth embodiment with an open axial securing ring
  a) in a longitudinal section in a perspective view, in an axial view in a cross-sectional plane which contains the axial securing ring and
  b) the axial securing ring in the form of a detail.
Figure 4B:
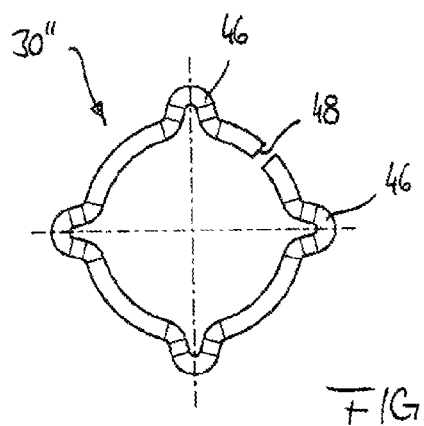

The connecting assembly shown in FIG. 4 largely corresponds to that of FIG. 3, so that, as far as common features are concerned, reference is made to the above description. Corresponding components have been given the same reference numbers and the reference numbers of modified components have been provided with two apostrophes. The only difference refers to the design of the axial securing ring 30" which, in the present embodiment, is provided in the form of an open ring. It can be seen that the point of separation 48 of the axial securing ring 30" is arranged in the circumferential direction between two adjoining projections 46.

All the above-mentioned connecting assemblies 2 are advantageous in that they permit a reliable and simply designed axial connection between the inner joint part 6 and the shaft journal 3. Because the axial securing ring 30 is secured in all its embodiments against being radially widened, the journal groove 34 holding the axial securing ring 30 can comprise a minimum depth. This has an advantageous effect on the strength of the shaft journal 3, because any cross-sectional weakening and the notch effect are kept to a minimum. Furthermore, there is required only a small number of parts in order to achieve axial security. Prior to being slid on to the shaft journal 3, the constant velocity universal joint is completely pre-assembled, which has an advantageous effect on the effort of the final assembly stage. If required, the connecting assembly 2 can be released, so that the functional ability of the individual components is fully maintained.

The invention claimed is:

1. A connecting assembly for use in the driveline of a motor vehicle, comprising:
    a shaft journal with an outer journal groove;
    a constant velocity universal joint with an inner joint part which is connected to the shaft journal in a rotationally fixed way for transmitting torque, wherein the inner joint part comprises a sleeve-like portion with an inner annular groove;
    a radially elastically widenable axial securing ring which is provided for axially fixing the inner joint part and which is positioned in the journal groove of the shaft journal; and
    a sleeve element which is arranged on the sleeve-like portion and prevents the axial securing ring from being radially widened.

2. The connecting assembly according to claim 1, wherein the axial securing ring comprises at least two outwardly projecting portions, the sleeve element, in the mounted condition, restricting an outward movement of the projecting portions.

3. The connecting assembly according to claim 2, wherein the axial securing ring is provided in the form of a snap ring.

4. The connecting assembly according to claim 3, wherein, the at least two outwardly projecting portions form the ends of the snap ring.

5. The connecting assembly according to claim 3, wherein the projecting portions of the snap ring radially project approximately as far as the outer circumferential face, when the snap ring engages the journal groove.

6. The connecting assembly according to claim 3, wherein in a partial circumferential region of the inner annular groove, the sleeve-like portion comprises a recess opening into an outer circumferential face in which there are received the outwardly projecting portions of the snap ring.

7. The connecting assembly according to claim 6, wherein the sleeve element is positioned on the sleeve-like portion of the inner joint part and covers the at least one recess.

8. The connecting assembly according to claim 7, wherein the sleeve element comprises an annular bead which engages an outer annular groove of the sleeve-like portion for axial securing purposes.

9. The connecting assembly according to claim 8, wherein the sleeve element is fixed by means of a binding element which can only be closed when the annular bead of the sleeve element engages the annular groove of the sleeve-like portion.

10. The connecting assembly according claim 2, wherein the at least two outwardly projecting portions are provided in the form of circumferentially distributed bulging portions of the axial securing ring.

11. The connecting assembly according to claim 10, wherein the outwardly projecting portions are uniformly distributed around the circumference.

12. The connecting assembly according to claim 10, wherein there are provided at least three outwardly projecting portions.

13. The connecting assembly according to claim 10, wherein partial circumferential regions of the inner annular groove, the sleeve-like portion comprises a plurality of radial recesses towards an outer circumferential face into which there extend the projecting portions of the axial securing ring.

14. The connecting assembly according to claim 13, wherein the projecting portions comprise radially outward ends, which outward ends radially project approximately as far as the outer circumferential face of the sleeve-like portion, when the axial securing ring engages the journal groove.

15. The connecting assembly according to claim 1, wherein the axial securing ring is provided in the form of a continuously closed ring.

16. The connecting assembly according to claim 1, wherein a cross-section of the axial securing ring is such that an axial relative movement relative to the shaft journal causes the axial securing ring to radially elastically widen.

17. The connecting assembly according to claim 1, wherein a depth of the journal groove, which is snappingly engaged by the axial securing ring, is smaller than a depth of the annular groove of the sleeve-like portion.

18. The connecting assembly according to claim 1, wherein for connecting the inner joint part with the shaft journal in a rotationally fixed way, there are provided shaft splines, wherein the annular groove which is engaged by the axial securing ring is arranged so as to axially adjoin the shaft splines.

19. A connecting assembly for use in the driveline of a motor vehicle, comprising:
a shaft journal with an outer journal groove;
a constant velocity universal joint with an inner joint part which is connected to the shaft journal in a rotationally fixed way for transmitting torque, wherein the inner joint part comprises a sleeve-like portion with an inner annular groove;
a radially elastically widenable axial securing ring which is provided for axially fixing the inner joint part and which is positioned in the journal groove of the shaft journal; and
a sleeve element which is arranged on the sleeve-like portion and prevents the axial securing ring from being radially widened;
wherein the sleeve element includes an inner face against which the axial securing ring abuts, thereby preventing a radial widening of the axial securing ring.

* * * * *